US010158548B2

United States Patent
Naar et al.

(10) Patent No.: US 10,158,548 B2
(45) Date of Patent: Dec. 18, 2018

(54) METHODS AND SYSTEMS FOR SIGNING RESOURCE IDENTIFIERS

(71) Applicant: FACEBOOK, INC., Menlo Park, CA (US)

(72) Inventors: Dekel Shmuel Naar, Tel Aviv (IL); Itay Duvdevani, Rosh HaAyin (IL)

(73) Assignee: Facebook, Inc., Menlo Park, CA (US)

( * ) Notice: Subject to any disclaimer, the term of this patent is extended or adjusted under 35 U.S.C. 154(b) by 205 days.

(21) Appl. No.: 15/246,096

(22) Filed: Aug. 24, 2016

(65) Prior Publication Data

US 2018/0063270 A1    Mar. 1, 2018

(51) Int. Cl.
| | | |
|---|---|---|
| G06F 15/16 | (2006.01) | |
| H04L 12/26 | (2006.01) | |
| H04L 29/08 | (2006.01) | |
| H04L 12/14 | (2006.01) | |

(52) U.S. Cl.
CPC ........ H04L 43/106 (2013.01); H04L 12/1496 (2013.01); H04L 67/02 (2013.01); H04L 67/2804 (2013.01); H04L 67/2871 (2013.01)

(58) Field of Classification Search
USPC ................. 709/223, 224, 226, 229
See application file for complete search history.

(56) References Cited

U.S. PATENT DOCUMENTS

| | | | | |
|---|---|---|---|---|
| 7,571,325 B1* | 8/2009 | Cooley | ............... | H04L 63/0281 713/181 |
| 9,467,435 B1* | 10/2016 | Tyler | ....................... | H04L 63/08 |
| 2004/0186996 A1* | 9/2004 | Gibbs | ................... | H04L 63/123 713/168 |
| 2006/0031528 A1* | 2/2006 | Raguseo | ................ | H04L 67/06 709/227 |
| 2014/0012751 A1* | 1/2014 | Kuhn | ..................... | G06Q 20/36 705/41 |
| 2015/0200934 A1* | 7/2015 | Naguib | ................ | G06F 21/575 713/2 |
| 2017/0083486 A1* | 3/2017 | van der Horst | ......... | H04L 63/20 |

* cited by examiner

*Primary Examiner* — Liang Che A Wang
(74) *Attorney, Agent, or Firm* — Morgan, Lewis & Bockius LLP (57) ABSTRACT

Methods and systems for processing web pages by a server system (e.g., a proxy server) are disclosed. The proxy server is coupled to a user device and a plurality of web servers. The proxy server receives a first request for a first web page provided by a first web server from the user device. The first web page is zero-rated. In response to receiving the first request, the proxy server retrieves the requested first web page from the first web server. The proxy server then processes the retrieved first web page. The proxy server identifies one or more resource identifiers contained within the retrieved first web page and appends one or more signatures to the identified one or more resource identifiers respectively. Each identified resource identifier is associated with a content item that is zero-rated. The proxy server further forwards the processed first web page to the user device.

18 Claims, 5 Drawing Sheets

METHODS AND SYSTEMS FOR SIGNING RESOURCE IDENTIFIERS

TECHNICAL FIELD

This relates generally to network communications, including but not limited to signing one or more resource identifiers in a web page to ensure that one or more requests based on the respective one or more resource identifiers are related to the web page.

BACKGROUND

Mobile devices have become an increasingly dominant means through which consumers access, download, and consume electronic content over the Internet. Despite substantial advancements in telecommunications technology, however, affordable access to the Internet remains relatively low. Considering the limited affordability of Internet access in certain geographic regions, such as developing countries, consumers often have difficulty accessing the Internet and therefore are often left frustrated when using mobile devices. Recently, free Internet services, referred to as "zero-rated" services, are becoming an increasingly popular option to improve the affordability of Internet access.

SUMMARY

Accordingly, there is a need for methods, devices, and systems for improving network operability and for managing zero-rated data exchanged between user devices and web servers. Embodiments set forth herein are directed to methods, devices, and systems for processing web pages and handling requests by a proxy server. Zero-rated (e.g., free) access to certain content (e.g., zero-rated content) on the Internet may be provided to users at no cost, while non-zero-rated (e.g., paid) access to other content (e.g., non-zero-rated content) on the Internet may also be offered on other terms. By having a proxy server route traffic exchanged between user devices and web servers, the user devices can access the Internet at predetermined rates or at no cost.

A proxy server is configured to retrieve and process zero-rated web pages to ensure subsequent requests generated from a zero-rated web page are also zero-rated. The proxy server validates retrieved web pages to ensure that only whitelisted webpages (e.g., whitelisted as zero-rated) are forwarded to user devices. The proxy server also applies signatures to one or more resource identifiers on the zero-rated web page. The signature may be unique to an individual web page and associated with a timestamp that expires after a certain period of time. By using the methods, devices, and systems discussed in the present disclosure, retrieval of resource items (e.g., content items) for a zero-rated web page can be efficiently and effectively performed for free (i.e., zero-rated).

In accordance with some embodiments, a computer-implemented method is performed at a server system (e.g., a proxy server) with one or more processors and memory storing instructions for execution by the one or more processors. The proxy server is coupled to a user device and a plurality of web servers. The proxy server receives a first request for a first web page provided by a first web server from the user device. The first web page is zero-rated. In response to receiving the first request, the proxy server retrieves the requested first web page from the first web server. The proxy server then processes the retrieved first web page. The proxy server identifies one or more resource identifiers contained within the retrieved first web page and appends one or more signatures to the identified one or more resource identifiers respectively. Each identified resource identifier is associated with a content item that is zero-rated. The proxy server further forwards the processed first web page to the user device.

In accordance with some embodiments, an electronic device (e.g., a user device) may include one or more processors, memory, and one or more programs; the one or more programs are stored in the memory and configured to be executed by the one or more processors. The one or more programs include instructions for performing the operations of the above method. In accordance with some embodiments, a non-transitory computer-readable storage medium has stored therein instructions that, when executed by the server system, cause the electronic device to perform the operations of the above method.

In accordance with some embodiments, a computer-implemented method is performed at an electronic device (e.g., a user device) with one or more processors and memory storing instructions for execution by the one or more processors. The user device is coupled to a proxy server for zero-rating. The method includes sending a first request for a web page that is zero-rated to the proxy server. In response to the first request, the user device renders the web page received from the proxy server. The received web page includes one or more resource identifiers appended with one or more signatures respectively. The method also includes generating a second request for obtaining a first content item associated with a first resource identifier of the one or more resource identifiers. The generated second request includes a first signature appended to the first resource identifier. The user device then sends the second request to the proxy server.

In accordance with some embodiments, a server system (e.g., a proxy server) may include one or more processors, memory, and one or more programs; the one or more programs are stored in the memory and configured to be executed by the one or more processors. The one or more programs include instructions for performing the operations of the above method. In accordance with some embodiments, a non-transitory computer-readable storage medium has stored therein instructions that, when executed by the electronic device, cause the electronic device to perform the operations of the above method.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first request could be termed a second request, and, similarly, a second request could be termed a first request, without departing from the scope of the various described embodiments. The first request and the second request are both requests, but they are not the same request.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
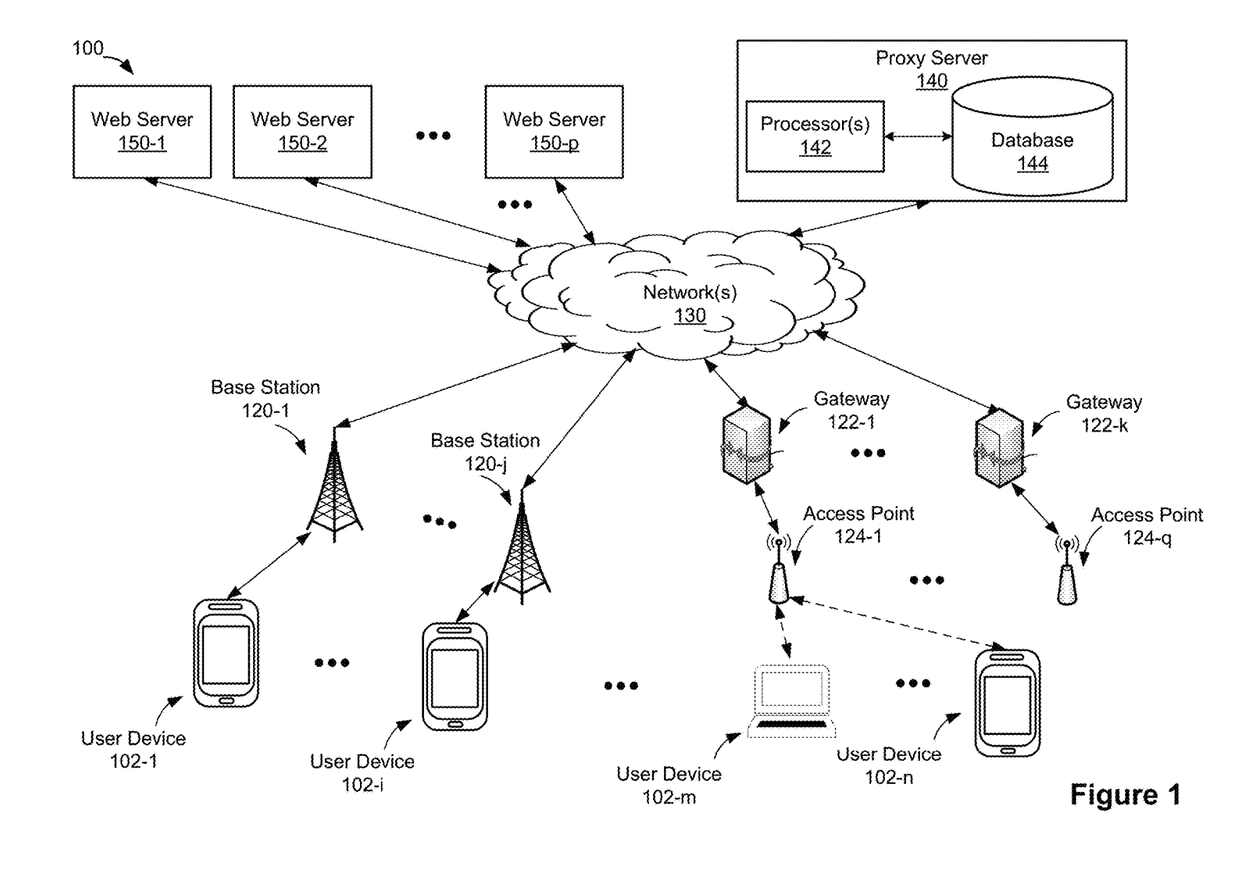
FIG. 1 is a block diagram illustrating a network architecture for providing network services, in accordance with some embodiments.

FIG. 1 illustrates a network architecture 100 in accordance with some embodiments. The network architecture 100 allows mobile carriers (and/or network providers) to provide one or more subscribers (e.g., users) Internet service with one or more pricing policies, e.g., for free (e.g., zero-rated), at special pricing, or at regular pricing. For example, a mobile carrier assigns respective pricing policies to IP addresses or domain names (e.g., domain addresses, host names, host addresses, URLs), web pages, and/or content types (e.g., text, image, audio, and/or video) associated with one or more web servers that provide Internet content to subscribers. The creation of the pricing policies also takes into consideration subscriber account types (e.g., pre-paid, having a zero balance, etc.), subscriber phone numbers, subscriber IP addresses, requested content types, applications running on subscriber devices, device location, and/or other device features.

The network architecture 100 routes the traffic from one or more subscriber devices to destination IP addresses using predetermined pricing policies (e.g., free, special pricing, or regular pricing). The network architecture 100 thus provides various products and/or functionalities (e.g., a Free Basics user interface for zero-rated content) to the subscribers.

In some embodiments, a subscriber device can access one or more predetermined IP addresses or one or more predetermined domain names in accordance with predetermined pricing policies. For example, for zero-rating service, a subscriber device can download, upload, and/or view a webpage or use an application associated with a predetermined IP address (or IP addresses) or a predetermined domain name for free, without being charged for network access. Thus these types of predetermined IP addresses or domain names are called "zero-rated." The content from zero-rated web pages and/or applications is called "zero-rated content."

In another example, for specially priced services, a network operator may provide promotions, such as discounted pricing, for accessing certain IP addresses or certain domain names, and/or certain content types (e.g., texts and/or images) from certain IP addresses or certain domain names. The specially priced services may be provided to certain subscribers as selected by the network operator.

In yet another example, for regularly priced services, a subscriber device can access one or more IP addresses or one or more domain names that are not zero-rated or are not specially priced by paying regular service fees. In some embodiments, one or more IP addresses or one or more domain names that are neither zero-rated nor specially priced are treated as regularly priced. The IP addresses or domain names that require paid network access are called "non-zero-rated" and include regularly priced content and/or specially priced content. The content provided by non-zero-rated content providers is called "non-zero-rated content" and includes regularly priced content and/or specially priced content.

The network architecture 100 includes client-side modules (e.g., as discussed with reference to FIG. 2) executed on a number of user devices (also called "client devices," "client systems," "client computers," "subscriber devices," or "clients") 102-1 . . . 102-i . . . 102-m . . . 102-n and server-side modules (e.g., as discussed with reference to FIG. 3) executed on one or more server systems, such as a proxy server 140 and/or one or more web servers 150-1, 150-2 . . . 150-p. The user devices 102 communicate with the server systems (e.g., the proxy server 140 and/or the one or more web servers 150) through one or more networks 130 (e.g., the Internet, cellular telephone networks, mobile data networks, other wide area networks, local area networks, metropolitan area networks, and so on). Client-side modules provide client-side functionalities for the network service platform (e.g., Internet service, zero-rated Internet service, special priced Internet service, and regularly priced Internet service) and communications with server-side modules. Server-side modules provide server-side functionalities for the network service platform (e.g., routing network traffic, serving internet content with specific pricing policies, and/or managing user account information) for any number of user devices 102.

In some embodiments, the user devices 102 are mobile devices and/or fixed-location devices. The user devices 102 are associated with subscribers (not shown) who employ the user devices 102 to access one or more IP addresses or domain names (e.g., including zero-rated content providers and/or non-zero-rated content providers). The user devices 102 execute web browser applications and/or other applications that can be used to access the one or more IP addresses or domain names. In some embodiments, a user device 102 processes requests for network services and forwards the requests from the user device 102 to the proxy server 140.

Examples of the user devices 102 include, but are not limited to, feature phones, smart phones, smart watches, personal digital assistants, portable media players, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), wearable computing devices, personal digital assistants (PDAs), enhanced general packet radio service (EGPRS) mobile phones, media players, navigation devices, game consoles, smart televisions, remote controls, combinations of any two or more of these data processing devices or other data processing devices, and/or other appropriate computing devices that can be used to communicate with the proxy server 140.

In some embodiments, the network architecture 100 includes one or more base stations 120-1 . . . 120-j for carrier networks that provide cellular service to the user devices 102. One or more network operators (e.g., network service providers, network carriers, or cellular companies) own or control the one or more base stations 120 and related infrastructure. For example, the base station 120 communicably connects one or more user devices 102 (e.g., 102-1) to one another (e.g., 102-i) and/or to the networks 130. In some embodiments, the network architecture 100 includes one or more gateways 122-1 . . . 122-k connected to one or more wireless access points 124-1 . . . 124-q respectively for providing Wi-Fi networks to the user devices 102 (e.g., 102-m, 102-n). The base stations 120 and the gateways 122 are responsible for routing traffic between the networks 130 and the user device 102.

In some embodiments, the proxy server 140 is implemented on one or more standalone computers or on a distributed network of computers. In some embodiments, the proxy server 140 also employs various virtual devices and/or services of third party service providers (e.g., cloud computing) to provide the underlying computing resources and/or infrastructure resources of the proxy server 140. The proxy server 140 includes one or more processors 142 and one or more databases 144. The one or more processors 142 process requests for respective network services from the user devices 102, and route or forward requests to corresponding web servers 150 to provide the network services with corresponding pricing policies. In some embodiments, the proxy server 140 is configured to forward or route data between the user devices 102 and the web servers 150 on a zero-rated basis (i.e., for free, at no data charges). The database 144 stores various information, including but not limited to information related to subscribers, information related to network operators, and/or pricing policies.

In some embodiments, the one or more web servers 150-1, 150-2 . . . 150-p include social networking servers configured to host various social networking functionalities. In some embodiments, the one or more web servers 150-1, 150-2 . . . 150-p include third-party servers configured to provide other types of services. In some embodiments, a given web server 150 hosts a website that provides web pages to user devices 102. Alternatively or additionally, a given web server 150 hosts an application that is used by user devices 102. As discussed above, the proxy server 140 may route or redirect requests from user devices 102 to respective web servers 150. In some embodiments, the proxy server 140 uses inline frames ("iframes") to nest independent web sites within a web page (e.g., a zero-rated, a regularly priced, or a specially priced web page). In some embodiments, the proxy server 140 uses iframes to enable third-party developers to create applications that are hosted separately by a web server 150 (e.g., a third-party server), but operate within a user session and are accessed through the user's profile in the proxy server 140. In some embodiments, a given web server 150 is used to provide third-party content (e.g., news articles, reviews, message feeds, etc.). In some embodiments, a given web server 150 is a single computing device, while in other embodiments, a given web server 150 is implemented by multiple computing devices working together to perform the actions of a server system (e.g., cloud computing).

In some embodiments, respective IP addresses or respective domain names associated with one or more web servers 150 are predetermined to be zero-rated content providers that are configured to provide zero-rated content to the user devices 102. A user device 102 does not need to pay data usage fees to a network provider for viewing, downloading, and/or uploading data to or from the one or more zero-rated content providers. In some embodiments, respective IP addresses or respective domain names associated with one or more web servers 150 are non-zero-rated content providers (e.g., regularly priced or specially priced) that provide non-zero-rated (e.g., paid) content. In some embodiments, whether or not content provided by a content provider is zero-rated depends on the content type. A user device 102 pays a data usage fee to a network provider for viewing, downloading, and/or uploading data to or from the one or more non-zero-rated content providers.

Figure 2:
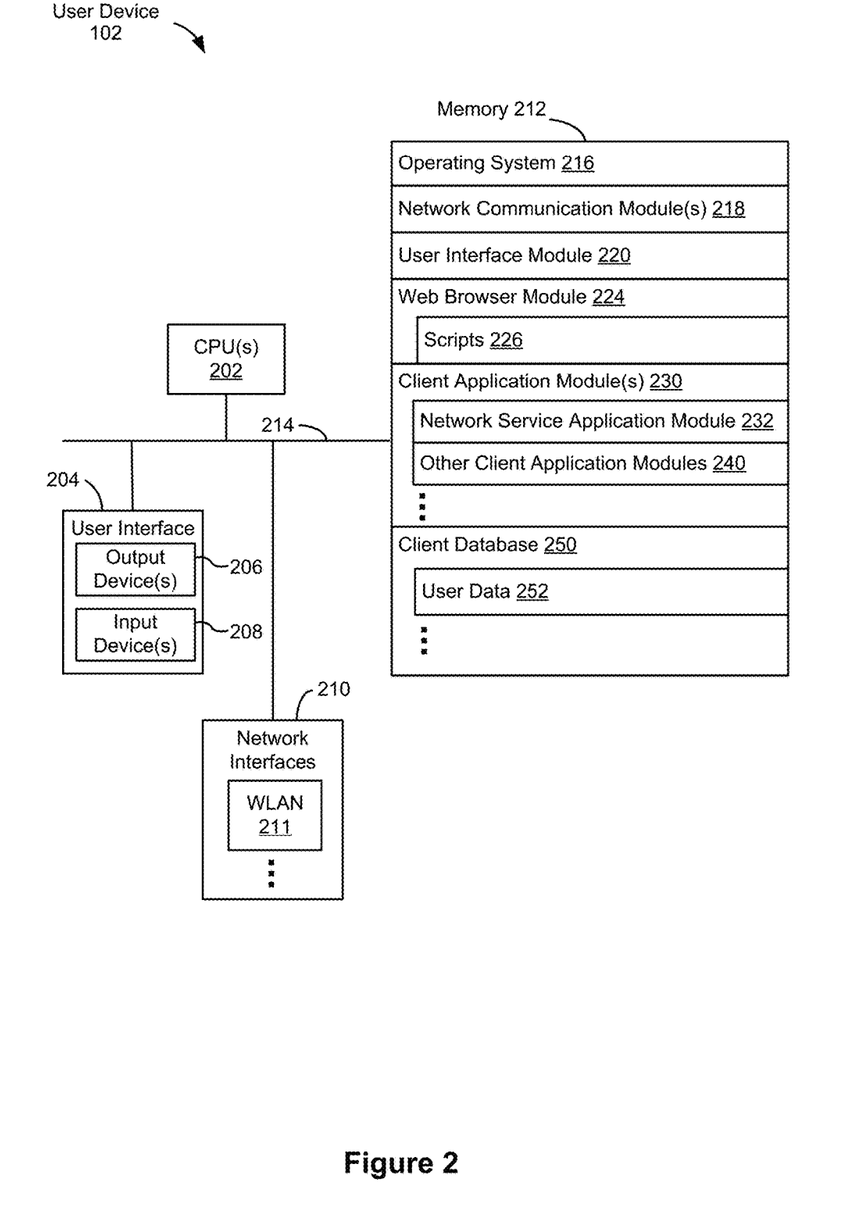
FIG. 2 is a block diagram illustrating a user device, in accordance with some embodiments.

FIG. 2 is a block diagram illustrating an exemplary user device 102 (e.g., one of the user devices 102-1 through 102-n, FIG. 1) in accordance with some embodiments. The user device 102 typically includes one or more central processing units (CPU(s)) (e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The user device 102 includes a user interface 204, including output device(s) 206 and input device(s) 208. In some embodiments, the input devices include a keyboard or a track pad. Alternatively, or in addition, the user interface 204 includes a display device that includes a touch-sensitive surface, in which case the display device is a touch-sensitive display. In user devices that have a touch-sensitive display, a physical keyboard is optional (e.g., a soft keyboard may be displayed when keyboard entry is needed). The output devices 206 also optionally include speakers and/or an audio output connection (i.e., audio jack) connected to speakers, earphones, or headphones. Optionally, the user device 102 includes an audio input device (e.g., a microphone) to capture audio (e.g., speech from a user). Furthermore, some user devices 102 use a microphone and voice recognition software to supplement or replace the keyboard. Optionally, the user device 102 includes a location-detection device, such as a GPS (global positioning satellite) or other geo-location receiver, and/or location-detection software for determining the location of the user device 102.

In some embodiments, the one or more network interfaces 210 include wireless and/or wired interfaces for receiving data from and/or transmitting data to other user devices 102, the proxy server 140, the web servers 150, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the one or more network interfaces 210 includes a wireless LAN (WLAN) interface 211 for enabling data communications with other WLAN-compatible devices and/or the proxy server 140 (via the one or more network(s) 130, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the user device 102 to other computing devices (e.g., the proxy server 140, the web servers 150, other user devices 102, and/or other devices) via the one or more network interface(s) 210 (wired or wireless);
- a user interface module 220 that receives commands and/or inputs from a user via the user interface 204 (e.g., from the input devices 208, which may include keyboards, touch screens, microphones, eye tracking components, three-dimensional gesture tracking components, and the like), and provides user interface objects and other outputs for display on the user interface 204 (e.g., the output devices 206, which may include a display screen, a touchscreen, a speaker, etc.);
- a web browser module 224 (e.g., Internet Explorer by Microsoft, Firefox by Mozilla, Safari by Apple, Opera by Opera Software, or Chrome by Google) for accessing, viewing, and interacting with web sites (e.g., zero-rated and/or non-zero rated web sites), which includes:
    - scripts 226 for the network service platform that is provided by the proxy server 140 (e.g., as embedded in a web page) and executed by the web browser module 224;
- one or more client application modules 230, including the following modules (or sets of instructions), or a subset or superset thereof:
    - a network service application module 232 for providing one or more functionalities related to network services provided by the proxy server 140; and
    - other optional client application modules 240, such as applications for social networking, word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and
- client database 250 for storing data associated with the network service platform, including, but is not limited to:
    - user data 252 storing user profile(s) and associated data of the user(s) of a client device 102 including, but not limited to, some or all of user account information, login credentials to the network service platform, payment data (e.g., linked credit card information, app credit or gift card balance, billing address, shipping address, etc.), bookmarked links (including zero-rated and/or non-zero rated), custom parameters (e.g., age, location, hobbies, etc.) of the user, contacts of the user, and identified trends and/or likes/dislikes of the user. For a given user, the user account information may include, for example, the user's name, profile picture, contact information, birth date, sex, marital status, family status, employment, education background, preferences, interests, and/or other demographic information.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 3:
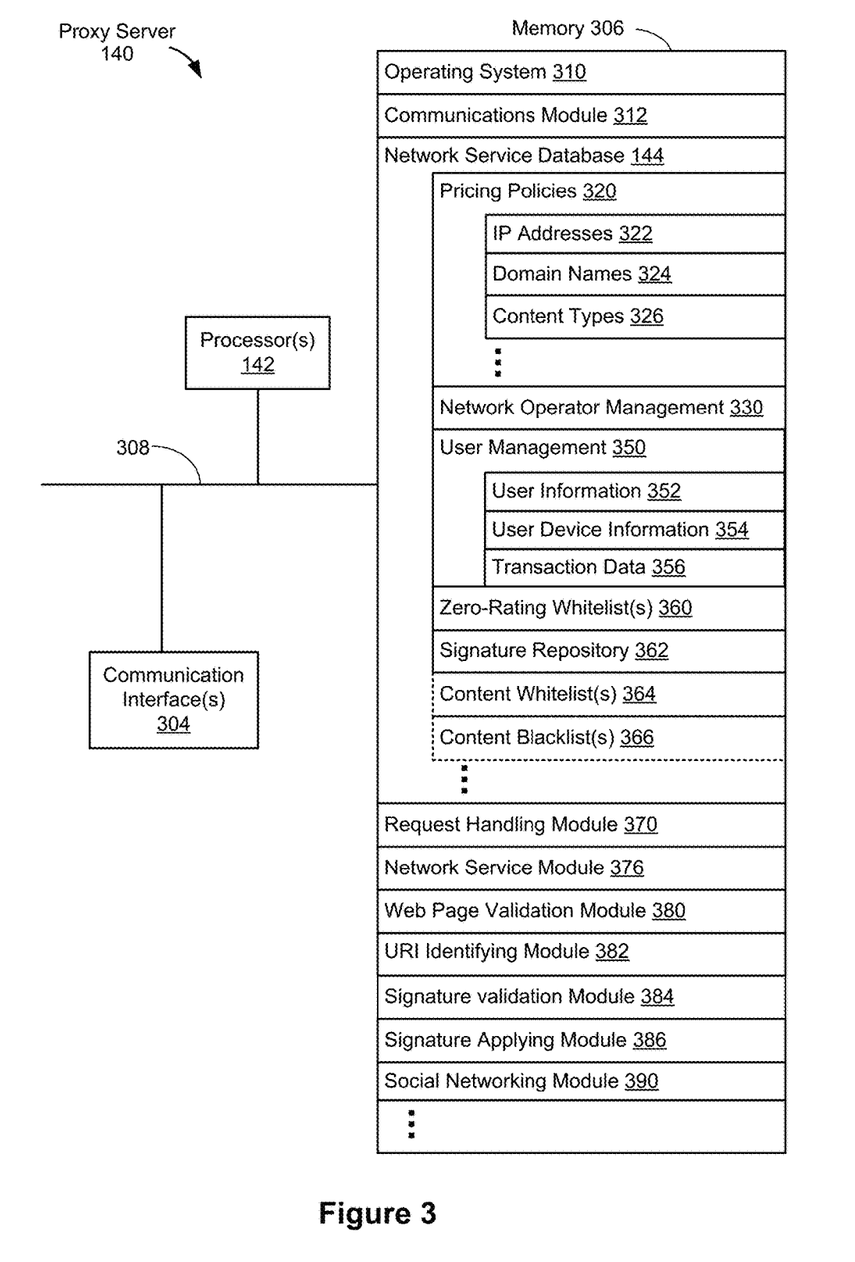
FIG. 3 is a block diagram illustrating a proxy server, in accordance with some embodiments.

FIG. 3 is a block diagram illustrating an exemplary proxy server 140 in accordance with some embodiments. The proxy server 140 includes one or more processing units (processors or cores) 142, one or more network or other communications interfaces 304, memory 306, and one or more communication buses 308 for interconnecting these components. The communication buses 308 optionally include circuitry (sometimes called a chipset) that interconnects and controls communications between system components. The proxy server 140 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 142. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 310 that includes procedures for handling various basic system services and for performing hardware dependent tasks;
- a network communication module 312 that is used for connecting the proxy server 140 to other computers via the one or more communication network interfaces 304 (wired or wireless) and one or more communication networks (e.g., the one or more networks 130);
- a network service database 144 for storing data associated with the network service platform, which includes:
  - pricing policies 320, including but not limited to:
    - IP addresses 322 including, but not limited to, some or all of one or more predetermined zero-rated IP addresses, specially priced IP addresses, and/or regularly priced IP addresses;
    - domain names 324 including, but not limited to, some or all of one or more predetermined zero-rated domain names, specially priced domain names, and/or regularly priced domain names; and
    - content types 326 including, but not limited to, some or all of one or more content types (e.g., texts, images, audios, and/or videos) for retrieval by the user devices 102 with predetermined pricing policies; and
  - network operator management information 330 including network operator information such as network segment information, network type, IP addresses and/or IP address blocks hosted by a respective network operator, etc.;
  - user management information 350, including but not limited to:
    - user information 352 such as user profiles, login information, privacy and other preferences, biographical data, and/or the like. In some embodiments, for a given user, the user information 352 may include data associated with the user's name, profile picture, contact information, birth date, sex, marital status, family status, employment, education background, preferences, interests, and/or other demographic information;
    - user device information 354 including, but not limited to, some or all of user device type, user device MAC address, Electronic Serial Number (ESN), International Mobile Station Equipment Identity (IMEI), Mobile Equipment Identifier (MEID), and/or other type(s) of user device identifier(s); and
    - transaction data 356 including, but not limited to, some or all of payment data (such as account balance, credit card information, app credit or gift card balance, billing address, shipping address, etc.) and/or purchased items (such as a network service type, data pack, etc.); and
  - zero-rating whitelist(s) 360 including URLs, web pages and/or domains that provide zero-rated content to the user devices 102 at zero-rating;
  - signature repository 362 storing one or more signatures generated for one or more uniform resource identifiers (URIs); in some embodiments, the one or more signatures are stored in association with the one or more URIs respectively, and/or in association with the web page that contains the one or more URIs; and
  - optionally, content whitelist(s) 364 storing one or more URIs, content types (e.g., images), HTML elements, HTML attributes, and/or HTML tags (e.g., <image>) that are related to zero-rated content items or files, the zero-rated content is allowed to be received by the user devices 102 at zero-rating; and
  - optionally, content blacklist(s) 366 storing one or more URIs, content types (e.g., videos), HTML elements, HTML attributes, and/or HTML tags (e.g., <video>) that are related to non-zero-rated content items or files, the non-zero-rated content is not allowed to be receive by the user devices 102 at zero-rating, in other words, the blacklisted URIs, content types, HTML elements, HTML attributes, and/or HTML tags can only be received by a user device 102 with data charges; and
- a request handling module 370 for handling and responding to requests from user devices 102, and for forwarding and routing requests or packets to corresponding web servers 150;
- a network service module 376 for providing network service (e.g., Free Basics service) with various pricing policies and related features (e.g., in conjunction with browser module 224 or application module 232 on the user device 102, FIG. 2);
- a web page validation module 380 for validating one or more web pages received from one or more web servers 150 against the zero-rating whitelist(s) 360;
- a URI identifying module 382 for identifying one or more URIs contained within a web page;
- a signature validation module 384 for validating the signatures included in requests from the user device 102;
- a signature applying module 386 for generating one or more signatures for one or more URIs contained within a web page, and for appending the one or more signatures to the one or more URIs respectively; and/or
- optionally, a social networking module 390 for providing social-networking services and related features (e.g., in conjunction with web browser module 224 or a social network application client module on the client device 102, FIG. 2).

In some embodiments, the network service module 376 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 4:
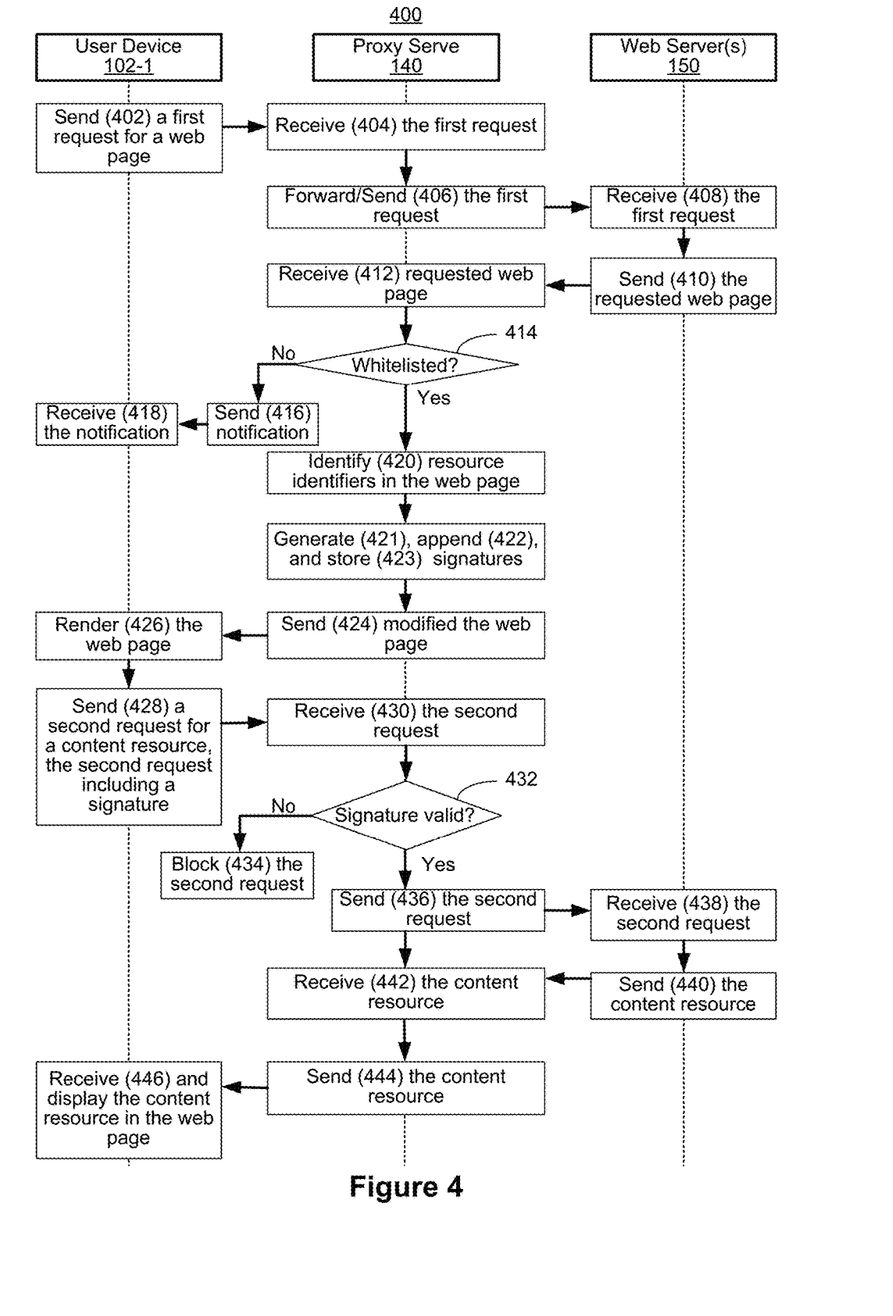
FIG. 4 is a flow diagram illustrating a method for signing one or more resource identifiers in a web page, in accordance with some embodiments.
Figure 5:
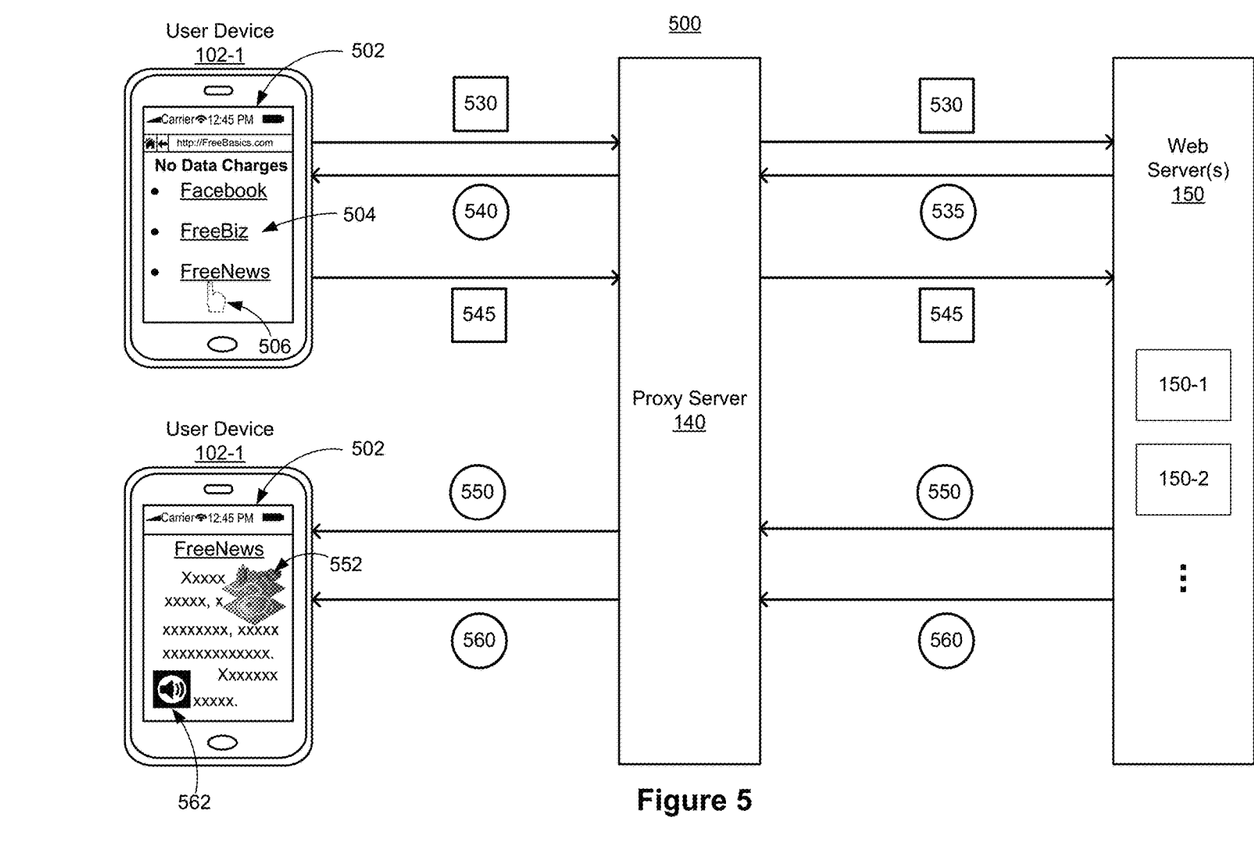
FIG. 5 is a diagram illustrating a process for processing web pages and for handling requests exchanged between a user device and one or more web servers by a proxy server coupled, in accordance with some embodiments.

FIG. 4 is a flow diagram illustrating a method 400 for signing one or more resource identifiers in a web page, in accordance with some embodiments. FIG. 5 is a diagram illustrating a process 500 for processing web pages and for handling requests exchanged between a user device and one or more web servers by a proxy server coupled, in accordance with some embodiments. One or more steps of method 400 and process 500 are performed by a user device 102 (e.g., user device 102-1, FIGS. 1-2), the proxy server 140 (FIGS. 1 and 3), and one or more web servers 150 (e.g., web server 150-1, web server 150-2, FIG. 1). The user device shown in FIGS. 4 and 5 can be any user device of the user devices 102-1 through 102-n as shown in FIG. 1. The web server shown in FIGS. 4 and 5 can be any one or more web servers of the web servers 150-1 through 150-p as shown in FIG. 1. One or more operations performed in method 400 and process 500 correspond to instructions stored in computer memories (e.g., memory 212, FIG. 2 and memory 306, FIG. 3) or other computer-readable storage mediums.

In some embodiments as illustrated in FIG. 5, a user accesses the Internet using the user device 102-1 (e.g., web browser module 224 or network service application module 232, FIG. 2) at zero-rating, i.e., at no data charges. For example, the user visits "http://FreeBasics.com" to view one or more zero-rated network services provided to the user. In some embodiments, the proxy server 140 is configured to host various network services provided by the domain "http://FreeBasics.com."

After the user submits a request to access "http://FreeBasics.com," the user device 102-1 provides a list 504 of service identifiers (e.g., tags, names, acronyms, service IDs, or resource identifiers, etc.) on user interface 502 as shown in FIG. 5. The service identifiers are associated with network services provided by one or more web servers 150 respectively. In some embodiments, the one or more web servers 150 provide zero-rated content items at no data charges to the user device 102-1. The service identifiers for services include, but are not limited to, identifiers related to social networking such as "Facebook," business such as "FreeBiz," and/or news content providers such as "FreeNews."

In some embodiments, each service identifier from the list 504 of service identifiers is associated with a web page address or a uniform resource link (URL). For example, a service identifier includes a hyperlink referenced to the corresponding URL. In some embodiments, the URL associated with a service identifier from the list 504 includes a domain of the proxy server 140, such that a request generated from the URL is directed to the proxy server 140.

Referring to FIG. 4, the user device 102-1 (e.g., user interface module 220, FIG. 2) receives a user selection of a service identifier from the list 504 of the service identifiers. For example as shown in FIG. 5, the user selects 506 the service identifier "FreeNews" using a finger touch on a touch screen or a mouse click on the user interface 502. Alternatively, the user can select "FreeNews" using a voice command function or other suitable input function(s) supported by user interface module 220 of the user device 102-1.

The user device 102-1 generates a request 530 for accessing content related to "FreeNews" based on the user selection. As discussed above, because the URL of the service identifier "FreeNews" is directed to the proxy server 140, the user device 102-1 sends (402) the request 530 to the proxy server 140. In some embodiments, the request 530 is a request for a "FreeNews" web page (e.g., the main page of "FreeNews") that is provided by web server 150-1. In some embodiments, the request 530 is associated with retrieving the "FreeNews" web page at zero-rating.

The proxy server 140 (e.g., request handling module 370, FIG. 3) receives (404) the request 530 corresponding to the request for the "FreeNews" web page. The proxy server 140 (e.g., request handling module 370, FIG. 3) further forwards (406) the request 530 to the corresponding web server 150, i.e., web server 150-1. The corresponding web server 150, e.g., web server 150-1, receives (408) the request 530. In response to the request 530, the web server 150-1 sends (410) the requested web page 535, i.e., the "FreeNews" web page, to the proxy server 140. The proxy server 140 receives (412) the web page 535, i.e., the "FreeNews" web page, from the web server 150-1.

In some embodiments, the proxy server 140 stores a whitelist (e.g., zero-rating whitelist(s) 360, FIG. 3) of web pages that are zero-rated. In some embodiments, upon receiving the web page 535, the proxy server (e.g., web page validation module 380, FIG. 3) determines (414) whether the retrieved web page 535, i.e., the "FreeNews" web page, is included in the zero-rating whitelist(s) 360. The web page validation module 380 may compare the URL and/or the domain name of the web page 535, i.e., the retrieved "FreeNews" web page, with one or more URLs and/or one or more domains included in the zero-rating whitelist(s) 360.

In accordance with a determination that the received web page 535 is not included in the zero-rating whitelist(s) 360 (414—No), the proxy server 140 sends (416) a notification to the user device 102-1 to notify the user that the requested content is not zero-rated. For example, the notification includes a text for display on the user device 102-1 "the requested web page is not free, do you want to proceed?" The user device 102-1 receives (418) and displays the notification to the user. The received "FreeNews" web page is not processed or forwarded to the user device 102-1 without receiving further instructions from the user. The user device 102-1 may be directed to a portal related to zero-rating program provided by the proxy server 140.

In accordance with a determination that the received web page 535 is included in the zero-rating whitelist(s) 360 (414—Yes), the proxy server 140 processes the received web page 535. In some embodiments, the proxy server 140 (e.g., URI identifying module 382, FIG. 3) identifies (420) one or more URIs contained within the web page 535. The one or more URIs are associated with one or more content items (or files), such as images, audios, and/or hyperlinks, included within the web page 535. In some embodiments, the URI identifying module 382 identifies one or more URIs based on HTML elements, HTML attributes, and/or HTML tags related to links to resources included (e.g., embedded) in a web page. Examples of HTML elements, HTML attributes, and/or HTML tags related to links to resources include, but are not limited to, "a href=," "img src=," "source src=," "link href=,"<img>, <link>, <style>, <audio>, <map>, <object>, and <video>.

In some embodiments, the one or more URIs include absolute URLs (e.g., web addresses) of domains and/or relative URLs (e.g., a form of URI) linked to corresponding files. In some embodiments, the one or more URIs from the web page 535 are related to content resources (also referred to as content items or files) to be retrieved from a single web server. This web server can be the same web server for retrieving web page 535 (e.g., web server 150-1). This web server can also be distinct from the web server for retrieving web page 535. In some embodiments, the one or more URIs from the web page 535 are related to files or content items to be retrieved from a plurality of distinct web servers, e.g., including web server 150-1 and web server 150-2.

In some embodiments, the proxy server 140 (e.g., signature applying module 386, FIG. 3) generates (421) one or more signatures in association with the one or more URIs and applies the signatures to the one or more URIs respectively. In some embodiments, a signature in association with a URI includes a combination of one or more characters selected from the following categories: uppercase characters of European languages (A through Z, with diacritic marks, Greek and Cyrillic characters), lowercase characters of European languages (a through z, sharp-s, with diacritic marks, Greek and Cyrillic characters), 10 digits (0 through 9), non-alphanumeric characters (such as: ~!@#$%^&*_-+='|\(){ }[ ]:;'"<>,.?/), and any Unicode character that is categorized as an alphabetic character but is not uppercase or lowercase (such as Unicode characters from Asian languages.

In some embodiments, a signature in association with a URI is a hash of the URI or a hash of a certain string from the URI. In some embodiments, a signature in association with a URI is a hash of HTML of the web page 535 or a hash of a portion of HTML of the web page 535. In some embodiments, a signature in association with a URI is a hash of the URL of the web page 535 (in such situation, all signatures for the same web page, e.g., web page 535, may be identical). One or more hash functions used for generating (421) the signatures include, but are not limited to, Message Digest 5 (MD5), Secure Hash Algorithm (SHA), or any other suitable hash functions.

In some embodiments, each signature of the one or more signatures is further associated with a timestamp that expires after a predetermined time period. In some embodiments, a timestamp is issued to each signature by a timestamper, such as the proxy server 140, a different computing system in communication with the proxy server 140, or a third party such as Time Stamping Authority (TSA). In some embodiments, a timestamper concatenates a timestamp to a hash value of the corresponding signature, and then calculates a hash of this concatenation. The hash of the concatenation is thereby digitally time stamped.

In some embodiments, the signatures for different URIs within the web page 535 are distinct from each other. In some embodiments, the distinct signatures for URIs within the same web page can be recognized by the proxy server 140 as having an identical source, i.e., the URIs are from the same web page. In some alternative embodiments, the signatures for different URIs within the web page 535 are identical. That is, the one or more URIs from the web page 535 use the same signature for each URI of the one or more URIs. For example, the one or more URIs from the web page 535 all use a hash of the URL or HTML of web page 535. The proxy server 140 (e.g., signature applying module 386, FIG. 3) appends (422) a respective signature of the generated signatures to a respective URI of the identified one or more URIs. In some embodiments, the proxy server 140 appends a signature to the beginning, in the middle, or at the end of a corresponding URI.

In some embodiments, in accordance with a determination that web page 535 is zero-rated, the proxy server 140 (e.g., signature applying module 386, FIG. 3) applies (422) (e.g., appends) signatures to all URIs contained within the web page 535. In some alternative embodiments, the proxy server 140 (e.g., signature applying module 386, FIG. 3) only applies (422) (e.g., appends) signatures to URIs related to zero-rated content items, without applying signatures to URIs related to non-zero-rated content items. For example, the proxy server 140 checks identified URIs and/or content types related to the identified URIs against the content blacklist(s) 366 (FIG. 3). The proxy server 140 compares the identified URIs from the web page 535 with the URIs listed in the content blacklist(s) 366. In yet some other embodiments, the proxy server 140 recognizes content types from HTML elements, attributes, and/or tags contained within the web page 535. The proxy server 140 then compares the recognized content types against the content blacklist(s) 366. For example, the proxy server 140 might not apply signatures to URIs associated with <video> tags, because videos are typically not zero-rated. The proxy server 140 might, however, apply signatures to URIs associated with <img> tags, because images are typically zero-rated.

In some embodiments, the proxy server 140 stores (423) the generated signatures in a database (e.g., the signature repository 362, FIG. 3) of the proxy server 140. In some embodiments, the proxy server 140 stores the one or more signatures in association with the one or more URIs contained within web page 535 respectively. Additionally or alternatively, the proxy server 140 stores the one or more signatures in association with the retrieved web page 535. In this way, the proxy server 140 can identify one or more subsequent requests (e.g., including request 545) initiated from the user device 102-1 correspond to the same web page (e.g., web page 535). The proxy server 140 can effectively and efficiently unify the subsequent requests generated from the same web page to a single session.

The proxy server 140 sends (424) the processed web page 540 to the user device 102-1. The user device 102-1 receives and renders (426) the processed web page 540. In some embodiments, the user device 102-1 sends (428) one or more requests for one or more content items respectively that are contained within web page 540. For example, the user device 102-1 sends a request 545 for an image 552 contained within web page 540. The user device 102-1 may also send a request for an audio file 562 embedded in web page 540. In some embodiments, the request 545 is generated based on and includes a URI (e.g., corresponding to the image 552 or corresponding to the audio file 562) contained within the web page 535. The request 545 also includes a signature associated with the corresponding URI. In some embodiments, the request 545 is automatically generated by the user device 102-1 in response to rendering the web page, including but not limited to parsing HTML, displaying the web page, retrieving and displaying images, and retrieving and playing audio files. In some embodiments, the request 545 is generated in response to receiving a user input on the user interface 502 or any other user input interface 204 of the user device 102-1. For example, the user may select to open an embedded link in the web page after the web page is displayed on the user device 102-1.

The proxy server 140 receives (430) the request 545. In some embodiments, the proxy server 140 (signature validation module 384, FIG. 3) validates the received request 545. For example, the signature validation module 384 validates (432) the signature included in the request 545. In some embodiments, the signature validation module 384 compares the signature included in the request 545 against one or more signatures stored in the signature repository 362 (FIG. 3). In some embodiments, the signature validation module 384 also checks whether the timestamp associated with the request 545 is expired.

In accordance with a determination that the signature of the request 545 is included in the signature repository 362 and the timestamp is not expired, the signature validation module 384 determines that the signature in request 545 is valid (432—Yes). The proxy server 140 identifies that the request 545 is associated with a URI and/or a web page (e.g., web page 535) and unifies this request 545 with one or more other requests associated with web page 535.

In accordance with a determination that the signature included in the request 545 is not included in the signature repository 362, the signature validation module 384 determines that the signature in request 545 is invalid (432—No). Alternatively or additionally, in accordance with a determination that the timestamp of the signature is expired, the signature validation module 384 also determines that the signature in request 545 is invalid (432—No). For example, the request is from a cached page or a tampered page. The proxy server 140 blocks (434) the invalid request without sending the invalid request to any web server 150. The proxy server 140 may send a notification to the user device 102-1 regarding such invalid request.

In some embodiments, the signature validation module 384 determines that a request from a user device, such as a request subsequent to rendering a web page on the user device, does not include a signature. The signature validation module 384 determines that the signature validation fails (432—No). In one example, one or more URIs may be omitted (e.g., neglected, missed, intentionally or forgetfully) during the signing process discussed in processes 420 and 422 of method 400. A request generated from such an URI may not include a signature. In another example, one or more URIs may be determined to be related to non-zero-rated content (e.g., a video) at process 420 of method 400, thus no signature is attached to such non-zero-rated URIs. The proxy server 140 blocks (434) a request without a signature without forwarding such request to web server(s) 150. The web page to be rendered on the user device 102-1 does not include such non-zero-rated content items. In some embodiments, the user device 102-1 displays a notification, such as "this content is not free to view," in the corresponding location within the web page. Alternatively or additionally, the user device 102-1 may be directed to a portal for zero-rating, such as a web page displaying policies for zero-rating, or a user interface for checking user account balance and/or depositing money into the user account for viewing non-zero-rated content.

In some embodiments as discussed above with reference to process 422 of method 400, all URIs contained within a zero-rated web page are signed without further validation. However, one or more URIs included in a zero-rated web page may be related to a non-zero-rated content types, such as a video. Alternatively or additionally, one or more URIs included in a zero-rated web page may be related to content resources provided by a third-party web server that is not zero-rated (i.e., not configured to provide zero-rated content to user devices 102 at zero-rating). In order to avoid such non-zero-rated data leakage, the proxy server 140 may validate the URIs included in the requests generated from the zero-rated web page at this stage (i.e., at process 432 of method 400). In some embodiments, the proxy server 140 stores a whitelist (e.g., content whitelist(s) 364, FIG. 3) of one or more URIs, content types (e.g., images), HTML elements, HTML attributes, and/or HTML tags (e.g., <image>) that are related to zero-rated content resources. In some alternative or additional embodiments, the proxy server 140 also stores a blacklist (e.g., content blacklist(s) 366, FIG. 3) of one or more URIs, content types (e.g., videos), HTML elements, HTML attributes, and/or HTML tags (e.g., <video>) that are related to non-zero-rated content items or files. The proxy server 140 validates the URI included in request 545 against the content whitelist(s) 364 and the content blacklist(s) 366 to determine whether the URI or the content resource reference by the URI is zero-rated. In accordance with a determination that the URI included in request 545 is zero-rated, the proxy server 140 sends the request 545 to the corresponding web server referenced by the URI. In accordance with a determination that the URI included in request 545 is non-zero-rated, the proxy server 140 blocks the request 545 without forwarding it to any web server. The proxy server 140 may further send a notification to the user device 102-1 regarding such request for non-zero-rated content. The user device 102-1 may be redirected to a portal related to zero-rating program provided by the proxy server 140.

In accordance with a determination that the signature included in the request 545 4 is valid (432—Yes), the proxy server 140 sends (436) the request 545 to the web server referenced by the URI in the request 545. The web server receives (438) the request 545 and sends (440) the content resource as requested by request 545. For example, when request 545 is generated based on a URI associated the image 552, the web server sends data packet(s) 550 related to the image 552 to the proxy server 140. When request 545 is generated based on a URI associated with the audio file 562, the web server sends data packet(s) 560 related to the audio file 562 to the proxy server 140.

In some embodiments, all URIs from web page 535 reference content items or files provided by the same web server 150-1. The proxy server 140 sends (436) the request 545 to web server 150-1. The web server 150-1 receives (438) the request 545. The web server 150-1 sends (440) the content item or the file referenced by the URI included in the request 545 to the proxy server 140.

In some alternative embodiments, one or more URIs from web page 535 reference content items or files provided by web server(s) (e.g., web server 150-2 or other third-party web servers) that are distinct from web server 150-1 that provides web page 535. The proxy server 140 sends (436) the request to web server 150-2 or other third-party web servers. The web server 150-2 or other third-party web servers receive (438) the request 545. The web server 150-2 or other third-party web servers send (440) the content item or the file referenced by the URI included in the request 545 to the proxy server 140.

The proxy server receives (442) the content item or the file (e.g., data packet(s) 550 and/or 560) in response to the request 545. The proxy server further sends (444) the received content item or the file (e.g., data packet(s) 550 and/or 560) to the user device 102-1. The user device 102-1 receives and displays (446) the content resource in the web page. For example, the user device 102-1 displays the image 552 and/or plays the audio file 562 contained within the web page on the user interface 502.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a proxy server having one or more processors and memory storing instructions for execution by the one or more processors, wherein the proxy server is coupled to a user device and a plurality of web servers:
receiving, from the user device, a first request for a first web page provided by a first web server, wherein the first web page includes one or more zero-rated content items, each zero-rated content item comprising free content provided to a user at no cost to the user;
in response to receiving the first request, retrieving, from the first web server, the requested first web page;
processing the retrieved first web page, comprising:
identifying one or more resource identifiers contained within the retrieved first web page, each resource identifier associated with a respective zero-rated content item of the one or more zero-rated content items of the first web page;
for each of the identified one or more resource identifiers, appending a respective signature corresponding to the respective zero-rated content item of the one or more zero-rated content items;
forwarding the processed first web page to the user device;
receiving, from the user device, a second request that includes a first resource identifier of the retrieved first web page, the second request including a first signature appended to the first resource identifier, wherein the first resource identifier is associated with a first zero-rated content item;
validating the first signature; and
in accordance with a determination that the first signature is valid, retrieving the first zero-rated content item to provide to the user.

2. The method of claim 1, further comprising:
storing a first whitelist of web pages; and
determining whether the retrieved first web page is included in the first whitelist;
wherein processing the retrieved first web page is performed in accordance with a determination that the retrieved first web page is included in the first whitelist.

3. The method of claim 2, further comprising:
receiving, from the user device, a second request for a second web page provided by a second web server;
in response to receiving the second request, retrieving, from the second web server, the requested second web page;
determining whether the retrieved second web page is included in the first whitelist; and
in accordance with a determination that the retrieved second web page is not included in the first whitelist, sending an alert to the user device without processing the retrieved second web page.

4. The method of claim 1, further comprising:
generating the one or more signatures in association with the one or more resource identifiers, wherein a respective signature of the one or more signatures is a hash value of a corresponding resource identifier of the one or more resource identifiers.

5. The method of claim 4, further comprising:
storing the generated one or more signatures in association with the respective one or more resource identifiers and in association with the retrieved first web page in a database of the proxy server.

6. The method of claim 4, wherein:
the first signature includes a timestamp that expires after a predetermined time period;
validating the first signature comprises determining whether the timestamp of the first signature has expired; and
retrieving the first zero-rated content item is performed in response to a determination that the first timestamp has not expired.

7. The method of claim 5, wherein validating the first signature comprises checking the first signature against one or more signatures stored in the database of the proxy server.

8. The method of claim 7, further comprising:
in accordance with a determination that the second request does not include a valid signature appended to the first resource identifier, blocking the second request.

9. The method of claim 1, further comprising:
storing a second whitelist of zero-rated types of content items or zero-rated resource identifiers.

10. The method of claim 9, further comprising:
storing a blacklist of resource identifiers or content item types that are not zero-rated.

11. The method of claim 10, further comprising:
validating the first resource identifier in the second request against the second whitelist and the blacklist to determine whether the first zero-rated content item associated with the first resource identifier is zero-rated.

12. The method of claim 5, wherein:
the first signature includes a timestamp that expires after a predetermined time period; and
the method further comprises:
determining whether the timestamp of the first signature has expired;
in accordance with a determination that the first timestamp has expired:
blocking the second request; and
sending a notification to the user device.

13. A method, comprising:
at a computing device having one or more processors and memory storing instructions for execution by the one or more processors, wherein the computing device is coupled to a proxy server for zero-rating:
sending, to the proxy server, a first request for a web page that includes one or more zero-rated content items, wherein the one or more zero-rated content items comprise free content items provided to a user at no cost to the user;
in response to the first request, rendering the web page received from the proxy server, the received web page including one or more resource identifiers, each resource identifier associated with a respective zero-rated content item of the one or more zero-rated content items of the first web page, appended with one or more signatures respectively;
generating a second request for obtaining a first zero-rated content item associated with a first resource identifier of the one or more resource identifiers, wherein the generated second request includes a first signature appended to the first resource identifier; and
sending the second request to the proxy server.

14. The method of claim 13, wherein the one or more signatures are generated by the proxy server to be in association with the one or more resource identifiers, a respective signature of the one or more signatures being a hash value of a corresponding resource identifier of the one or more resource identifiers.

15. The method of claim 13, wherein a respective signature of the one or more signatures includes a timestamp that expires after a predetermined time period.

16. The method of claim 13, further comprising:
    displaying a list of resource identifiers corresponding to one or more web pages provided by respective web servers, wherein the one or more web pages include one or more zero-rated content items;
    receiving a user selection of a first resource identifier from the list of the resource identifiers; and
    in response to receiving the user selection, generating the first request.

17. The method of claim 13, wherein the second request is generated in response to rendering the web page on the user device.

18. A non-transitory computer-readable storage medium storing one or more programs for execution by one or more processors of an electronic device, the one or more programs including instructions for:
    receiving, from the user device, a first request for a first web page provided by a first web server, wherein the first web page includes one or more zero-rated content items, each zero-rated content item comprising free content provided to a user at no cost to the user;
    in response to receiving the first request, retrieving, from the first web server, the requested first web page;
    processing the retrieved first web page, comprising:
        identifying one or more resource identifiers contained within the retrieved first web page, each resource identifier associated with a respective zero-rated content item of the one or more zero-rated content items of the first web page;
        for each of the identified one or more resource identifiers, appending a respective signature corresponding to the respective zero-rated content item of the one or more zero-rated content items;
    forwarding the processed first web page to the user device;
    receiving, from the user device, a second request that includes a first resource identifier of the retrieved first web page, the second request including a first signature appended to the first resource identifier, wherein the first resource identifier is associated with a first zero-rated content item;
    validating the first signature; and
    in accordance with a determination that the first signature is valid, retrieving the first zero-rated content item to provide to the user.

* * * * *